United States Patent
Little (10) Patent No.: US 8,499,160 B2
(45) Date of Patent: *Jul. 30, 2013

(54) PUBLIC KEY ENCRYPTION WITH DIGITAL SIGNATURE SCHEME

(75) Inventor: Herb A. Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,520

(22) Filed: Jun. 11, 2012

(65) Prior Publication Data

US 2012/0257752 A1  Oct. 11, 2012

Related U.S. Application Data

(63) Continuation of application No. 12/724,950, filed on Mar. 16, 2010, now Pat. No. 8,219,819, which is a continuation of application No. 09/594,368, filed on Jun. 15, 2000, now Pat. No. 7,707,420.

(60) Provisional application No. 60/140,564, filed on Jun. 23, 1999.

(51) Int. Cl.
*H04L 9/00* (2006.01)

(52) U.S. Cl.
USPC .............. 713/176; 713/170; 713/171; 380/30

(58) Field of Classification Search
USPC .............................. 713/170, 171, 176; 380/30
See application file for complete search history.

(56) References Cited

U.S. PATENT DOCUMENTS

| | | | |
|---|---|---|---|
| 5,214,702 A | 5/1993 | Fischer | |
| 5,241,599 A | 8/1993 | Bellovin et al. | |
| 5,414,772 A | 5/1995 | Naccache et al. | |
| 5,537,475 A | 7/1996 | Micali | |
| 5,600,725 A | 2/1997 | Rueppel et al. | |
| 5,761,305 A | 6/1998 | Vanstone et al. | |
| 5,857,022 A | 1/1999 | Sudia | |
| 5,872,849 A | 2/1999 | Sudia | |
| 5,956,404 A | 9/1999 | Schneier et al. | |
| 6,028,933 A | 2/2000 | Heer et al. | |
| 6,122,736 A | 9/2000 | Vanstone et al. | |

FOREIGN PATENT DOCUMENTS

| | | |
|---|---|---|
| CA | 2312331 | 12/2000 |
| EP | 0639907 | 2/1995 |
| EP | 1063813 | 12/2000 |

OTHER PUBLICATIONS

Rivest, R. , Shamir, A. and Adleman, L., A Method for Obtaining Digital Signatures and Public-Key Cryptosystems, Feb. 1978, Communications of the ACM.

(Continued)

*Primary Examiner* — Tamara T Kyle (74) *Attorney, Agent, or Firm* — Integral Intellectual Property Inc.; Miriam Paton (57) ABSTRACT

An improved encryption and digital signature system and method in accordance with the invention reuses an encryption ephemeral key pair from an encryption process in a digital signature process. The reuse of the encryption ephemeral key pair in the digital signature process advantageously results in reduced byte size of the digital signature and reduction of costly computation overhead. In a preferred embodiment, the invention is based on the El Gamal encryption scheme and the Nyberg-Rueppel signature scheme. The present invention is particularly useful for operation in conjunction with small communication devices having limited processing and storage, wherein such devices may communicate via bandwidth sensitive RF links.

19 Claims, 5 Drawing Sheets

OTHER PUBLICATIONS

Elgamal, Taher, A Public Key Cryptosystem and a Signature Scheme Based on Discrete Logarithms, Jul. 4, 1985, IEEE Transactions on Information Theory, IEEE Inc., New York, NY, US, vol. 31, NR. 4, pp. 469-472.

IBM System Digital Signature Data Structure Format, May 1, 1993, IBM Technical Disclosure Bulletin, vol. 36, Issue 5, pp. 343-346.

Menezes, A., Van Oorschot, P. and Vanstone, S., Handbook of Applied Cryptography, Oct. 1996, CRC Press, ISBN: 0-8493-8523-7, pp. 294-298, 494, 506-512, 567.

Boyd, C. and Mathuria, A., Key Establishment Protocols for Secure Mobile Communications: A Selective Survey, Jul. 13, 1998, Australian Conference on Information Security and Privacy 1998 Proceedings.

Perez, Aram, Re: Digital signature and non-repudiation key usage bits, Aug. 21, 1998, http://www.imc.org/ietf-pkix/old-archive-98/msg01950.html.

Core PKI Services: Authentication, Integrity, and Confidentiality. Microsoft TechNet, 1999, http://www.microsoft.com/technet/security/guidance/identitymanagement/corepki.mspx.

Key Establishment Schemes Workshop Document, Oct. 2001, csrc.nist.gov/encryption/kms/schemes-overview.ppt.

Mobbs, Paul, Encryption and Digital Signatures, How to Protect Privacy, and Your Identity Online, GreenNet Civil Society Internet Rights Project, 2002, http://www.fraw.org.uk/mobbsey/gn-irt/irtb-03.pdf.

Code & Cipher, Certicom's Bulletin of Security and Cryptography, vol. 1, No. 2, 2003, http://www.certicom.com/download/aid-90/C&C_vol1_iss2.pdf.

PUBLIC KEY ENCRYPTION WITH DIGITAL SIGNATURE SCHEME

RELATED APPLICATIONS

This application is a continuation of U.S. patent application Ser. No. 12/724,950, entitled "Public Key Encryption With Digital Signature Scheme," filed on Mar. 16, 2010, which in turn, claims the benefit of and is a continuation of U.S. patent application Ser. No. 09/594,368, (now U.S. Pat. No. 7,707,420), entitled "Public Key Encryption With Digital Signature Scheme," filed on Jun. 15, 2000, which in turn claims priority to and the benefit of the U.S. Provisional Application No. 60/140,564, filed Jun. 23, 1999, entitled "Public Key Encryption With Digital Signature Scheme." All of these are hereby incorporated into the present application by reference.

BACKGROUND OF THE INVENTION

1. Field of the Invention

This invention relates to the field of public-key cryptography. More specifically, it is directed to a combined and improved public key encryption and digital signature scheme.

2. Background of the Invention

Cryptography essentially provides confidentiality, authentication, integrity and non-repudiation for communication between different parties over public communication channels.

In a public-key scheme, each user has a key pair consisting of a public key that is made publicly available, and a private key that is kept secret. The two keys are related by a hard one-way function, so as to make it infeasible to determine the private key from the public key. The public-key scheme allows a signature in the form of a digital signature to accompany a message.

In the public-key environment, there are preferably three major processes. First, there is the certification process. A certificate authority creates a certificate that binds a user identity to the public key. A certificate repository provides a database of certificates where the public can access and retrieve the public key information of participants. In addition, there is a registration authority that acts as an assistant to the certificate authority. In essence, the registration authority is used to validate the binding. The second process is the encryption scheme that essentially converts a plaintext message into a ciphertext message. The third process is a digital signature process. The present invention relates specifically to the latter process and how it may be combined with the encryption process.

A digital signature is a cryptographic primitive that provides a means for a user or an entity to bind its identity to a piece of information. A digital signature of a message is a sequence of bytes dependent on some secret known only to the signer, and, additionally, on the content of the message being signed. Such signatures must be verifiable, if a dispute arises as to whether a party signed a document. The process of signing entails transforming the message and a key unique to a particular user into a tag called a digital signature. A digital signature may be used to prove the identity of the sender and the integrity of data. To verify the digital signature, a recipient of a digitally signed message can use a verification rule associated with the digital signature scheme. Any attempt to modify the contents of the message or forge a signature will be detected when the signature is verified.

Each of the above stages requires a certain degree of undesirable computational processing and a certain degree of byte-size overhead associated in the transmission of a communication to make the overall public-key process secure.

Therefore, there remains an on going desire to reduce the additional byte and processing overhead associated with the public-key system while at the same time, not reducing the effectiveness of the public-key system.

SUMMARY OF THE INVENTION

It is an object of the invention to reduce some of the drawbacks of the prior art public-key systems.

It is an object of the invention to reduce computational processing associated with public-key schemes.

It is an object of the invention to reduce byte-size overhead associated with the transmission of the digital signature.

It is a further object of the present invention to provide a public key scheme with an improved encryption and digital signature scheme. The improved encryption and signature scheme can work in any finite cyclic group, such as a group of points on an elliptic curve over a finite field.

More specifically, in the present invention, there is provided an improved encryption and digital signature scheme that reuses an ephemeral key pair from the encryption process in the signature process. Advantageously, the reuse of the ephemeral key allows the digital signature to be reduced in byte size. Another advantage is that costly computation may be avoided.

According to the invention, a public-key encryption process comprises the steps of encrypting a plaintext message into a ciphertext message, the encrypting step includes the step of producing an ephemeral key pair, and signing a digital signature using the ephemeral key pair.

In another inventive aspect, a public-key encryption system comprises means for encrypting a plaintext message into a ciphertext message, the encrypting means producing an ephemeral key pair, and means for signing a digital signature using the ephemeral key pair.

A further aspect of the invention involves a software program on a computer-readable storage medium, which when executed by a processor performs a public-key encryption process comprising the steps of encrypting a plaintext message into a ciphertext message, the encrypting step includes the step of producing an ephemeral key pair, and signing a digital signature for the ciphertext message using the ephemeral key.

In a preferred embodiment described herein, the invention is based on the El Gamal encryption and Nyberg-Rueppel signature schemes. Other encryption and digital signature schemes are all well within the scope of the invention.

In the inventive process, system or software program, the ephemeral key pair may be produced by generating an encryption ephemeral private key x and calculating an encryption ephemeral public key $X=xG$, where G is a generator. According to a further preferred embodiment, the digital signature comprises a first value r and a second value s, and the encryption ephemeral public key X the ciphertext message and the second value s of the digital signature are transmitted from a sender to a receiver. At the receiver, the transmitted ciphertext message is decrypted, the first value r of the digital signature is calculated using the decrypted message and the transmitted encryption ephemeral public key X and the digital signature is validated based on the calculated first value r and the transmitted second value s.

With respect to the notation adopted herein and described below, the improved digital signature scheme uses the value of x, an encryption ephemeral key, for the value of z, a signature ephemeral key, instead of generating a random value for z, as in the prior art. Consequently, the transmitted digital signature of the present invention comprises a value s. A value of r, which according to conventional methods must be transmitted with the message, is instead reconstructed on the recipient end based on given values in the sender's transmission. In this improved scheme the overall combined El Gamal encryption scheme and the Nyberg-Rueppel digital signature scheme is optimized for faster computation time and lower overhead bandwidth. In particular, the computation of Z=zG is avoided by the sender in the digital signature stage and the byte-size overhead associated with the digital signature transmission is reduced.

The present invention is preferably configured to operate in conjunction with small devices having limited processing and storage such as those disclosed in co-pending U.S. patent application Ser. No. 09/106,585 titled "Hand-Held Electronic Device With a Keyboard Optimized for Use With The Thumbs", the disclosure of which is hereby incorporated into this disclosure by reference. Other systems and devices in which the invention may be implemented include, but are not limited to, wireless communication systems, wireless hand-held communication devices, personal digital assistants (PDAs), cellular phones and two-way pagers.

The present invention addresses specific dilemmas faced in electronic communication devices that are both bandwidth and computation load sensitive.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Notation Explanation

For clarity of the detailed description, the notation used herein is now defined. In the improved encryption and digital signature scheme to be described, any finite cyclic group, such as the group of points on an elliptic curve over a finite field is suitable for its application. In the preferred embodiment described herein, the present invention is based on combining the El Gamal encryption scheme and the Nyberg-Rueppel digital signature scheme. Other encryption and digital signature schemes are all well within the scope of the invention.

Upper case letters, such as A, B, G, K, Q, X, Z, denote group elements. An upper case G throughout this description is a generator of the group and has order n. Lower case letters, such as a, b, h, r, s, x, z, denote integers modulo (mod) n. An upper case letter with an asterisk, such as. Z*, denotes the conversion of a corresponding group element, i.e. Z, to an integer. For elliptic curves, Z=(x,y) and Z* is usually derived from the x of Z. The group operation is denoted by '+' and aA=A+A+ . . . +A, a times. In addition, ciphertext=encrypt (K, message) denotes a symmetric key encryption function that encrypts a plaintext message using a key derived from a group element K and returns the corresponding ciphertext. Likewise, message=decrypt (K, ciphertext) denotes a symmetric key decryption function that decrypts a ciphertext using a key derived from a group element K and returns the corresponding plaintext message. Finally, h=hash (message) denotes a cryptographically secure hash function that hashes a message to an integer modulo n.

The detailed description now follows with reference to FIGS. 1-5. In the functional diagrams of FIGS. 1-4, time is represented as increasing from the top to the bottom of the diagrams, as indicated by the "t" arrow at the top of each diagram.

Figure 1:
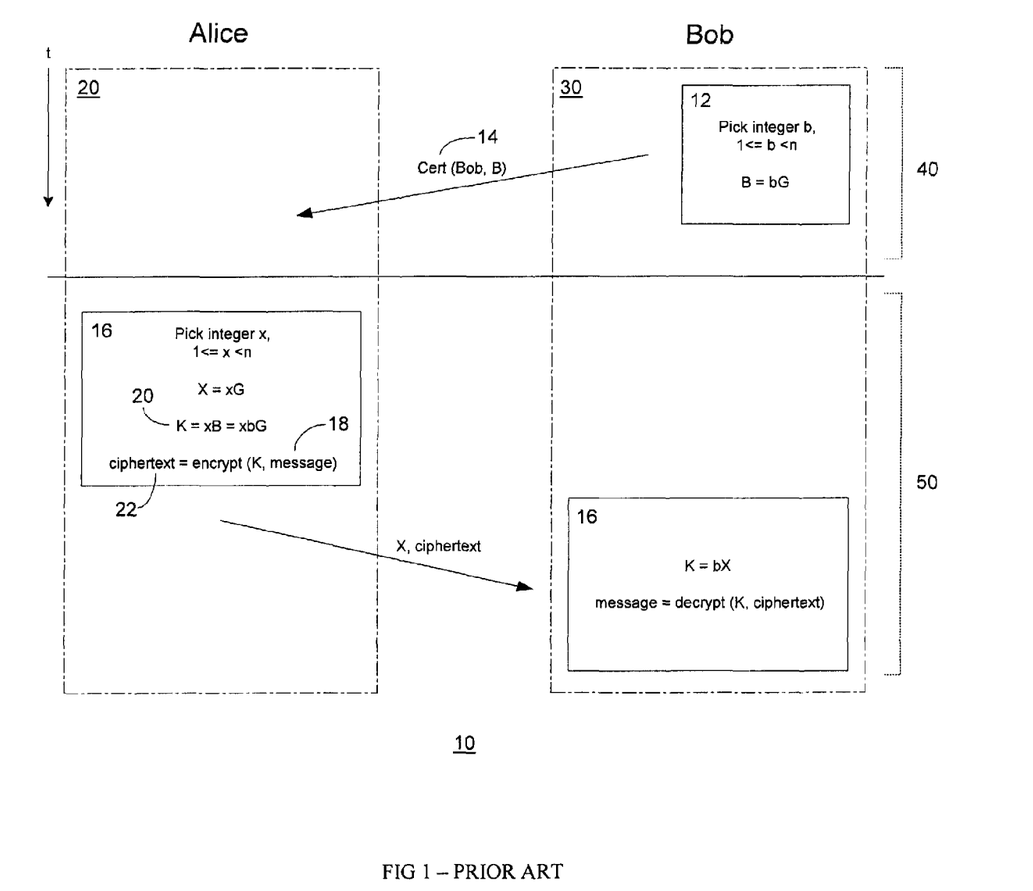
FIG. 1 is a functional diagram of a prior art El Gamal public-key encryption scheme.

FIG. 1 is a schematic of the prior art El Gamal public key encryption scheme 10. An encrypted message exchange between a notional sender, Alice 20, and a notional recipient, Bob 30 is illustrated therein. In a certification stage 40, Bob randomly generates private key b and computes public key B=bG, as shown at 12. For the purposes of this description, it is assumed that Alice has Bob's authentic public key B. A certification authority, if used, validates a public key by creating and issuing a certificate. Alice may receive Bob's certificate 14 directly from Bob, or from a publicly accessible public key repository. Alice verifies that the signature on the certificate is correct, and that the certificate has not expired or been revoked. If those conditions are satisfied, then the public key B in the certificate 14 may be trusted.

In the illustrated encryption process 10, the sender Alice performs the processing indicated in block 16. A random integer x, known as an encryption ephemeral private key is generated and an encryption ephemeral public key X=xG is calculated. X and x comprise an encryption ephemeral key pair. Alice then generates a secret encryption key K=xB=xbG and encrypts her plaintext message 18 with secret key K 20. The encryption ephemeral public key X and ciphertext message 22 are then transmitted to Bob. Bob then calculates secret key K=bX=bxG=xbG=xB and decrypts the ciphertext 22 back into plaintext message 18. This key agreement scheme is a protocol by which a pair of users, communicating over an insecure channel, may independently calculate the same secret key from publicly communicated values.

Figure 2:
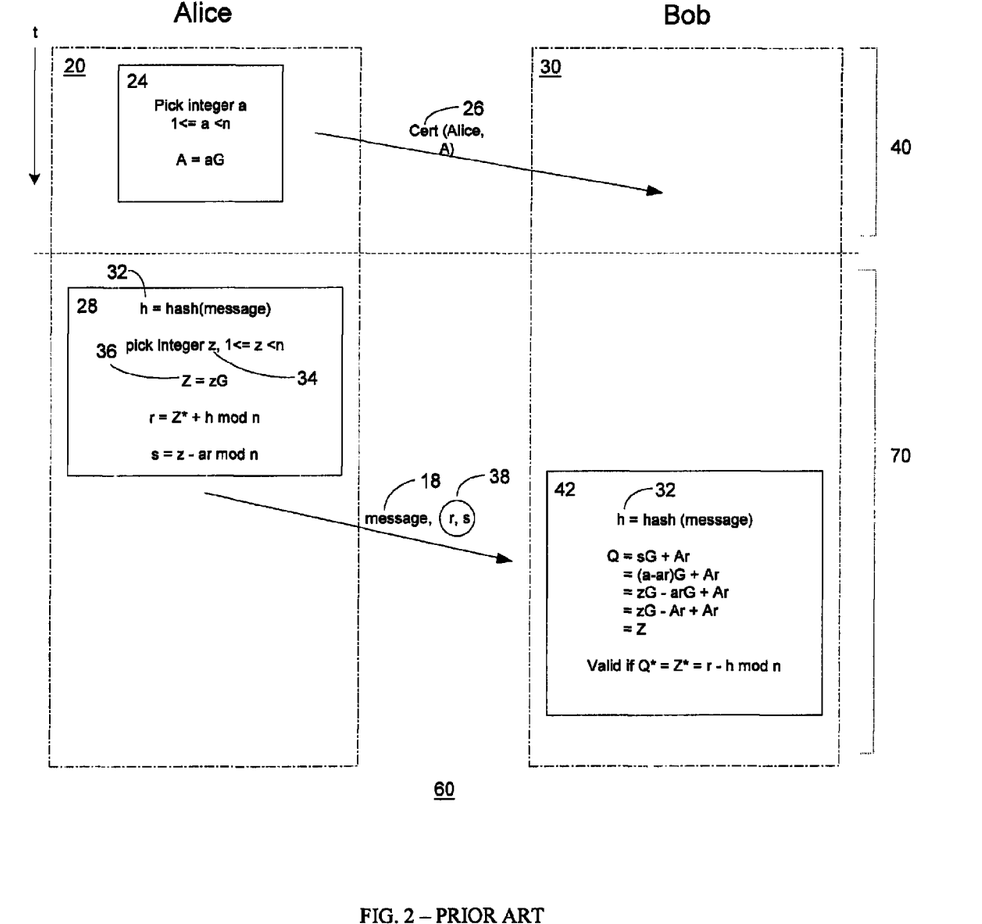
FIG. 2 is a functional diagram of a prior art Nyberg-Rueppel digital signatures scheme.

FIG. 2 is a schematic of the prior art Nyberg-Rueppel digital signature scheme 60. In this scheme, Alice randomly generates private key a and computes public key A=aG (see block 24). Similar to the scheme of FIG. 1, it is assumed that Bob has obtained Alice's authentic public key either directly from Alice or through a certificate 26 from a certification authority or public key repository. As shown in FIG. 2, a hash value h 32 is created from the message using a hash function. An ephemeral signature key pair (Z, z) is produced by randomly generating ephemeral signature private key z 34 and calculating ephemeral public key Z 36, where Z=zG. The digital signature 38, comprising values r=Z*+h mod n and s=z−ar mod n, are calculated and transmitted with message 18 to Bob.

This scheme requires the message 18 as input into the signature and verification algorithms 42. The verification portion of the scheme verifies a signature with Alice's public key A, given the digital signature 38 comprising integers r, s and the message 18. The recipient verifies the message by creating the hash value h 32 using the same hash function and processing it with Alice's public key. The verification output is compared with the received signature r, s to determine its validity, as shown in block 42.

Figure 3:
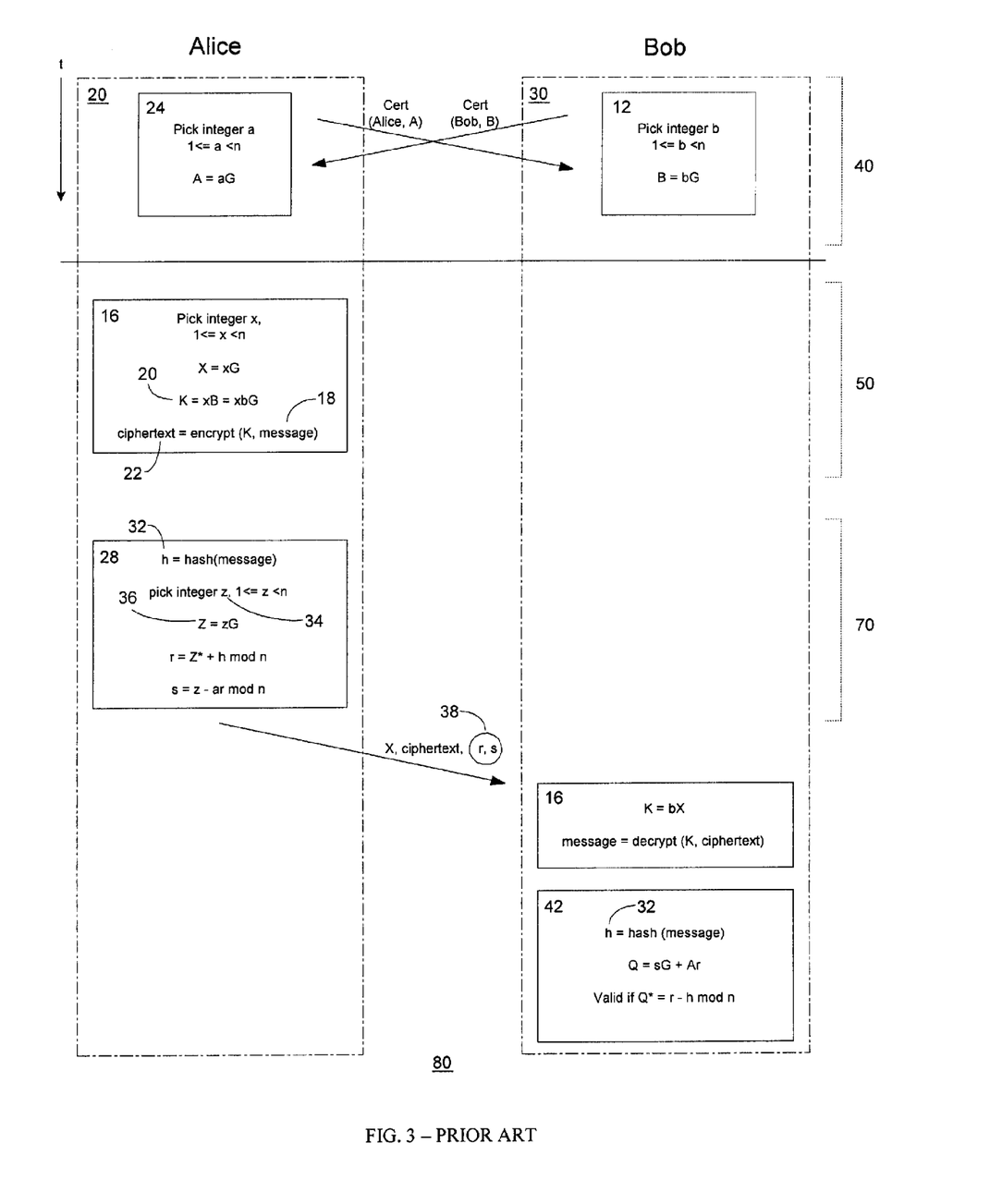
FIG. 3 is a functional diagram of a prior art public-key system combining the schemes illustrated in FIGS. 1 and 2.

FIG. 3 is illustrative of a traditional prior art public key encryption scheme using the El Gamal public key encryption scheme and the Nyberg Rueppel digital signature scheme. In this scheme 80, there are three main stages to a public key encryption scheme. First, there is a preliminary certification scheme 40, during which Alice and Bob obtain each other's authentic public key A and B. Second, there is an encryption process 50. Third, there is a digital signature scheme 70. As the El Gamal and Nyberg-Rueppel schemes have been described separately above, a detailed description of the combined encryption/signature scheme in FIG. 3 will not be pursued. However, it is highlighted that the signature ephemeral private key z 34 is randomly generated by the sender, the signature ephemeral public key Z 36 is computed by the sender and the transmitted digital signature 38 comprises the integers r and s. The values of r and s representing the transmitted digital signature 38 are transmitted with the encryption public key X and the ciphertext in the prior art.

There are, however, some undesirable characteristics associated with this prior art approach. Firstly, computational resources and time are consumed where Z is calculated with large bit numbers. Secondly, the byte-size overhead associated with the public-key transmitted information is undesirably large for bandwidth sensitive devices such as wireless communication devices. The present invention addresses these two undesirable qualities.

Figure 4:
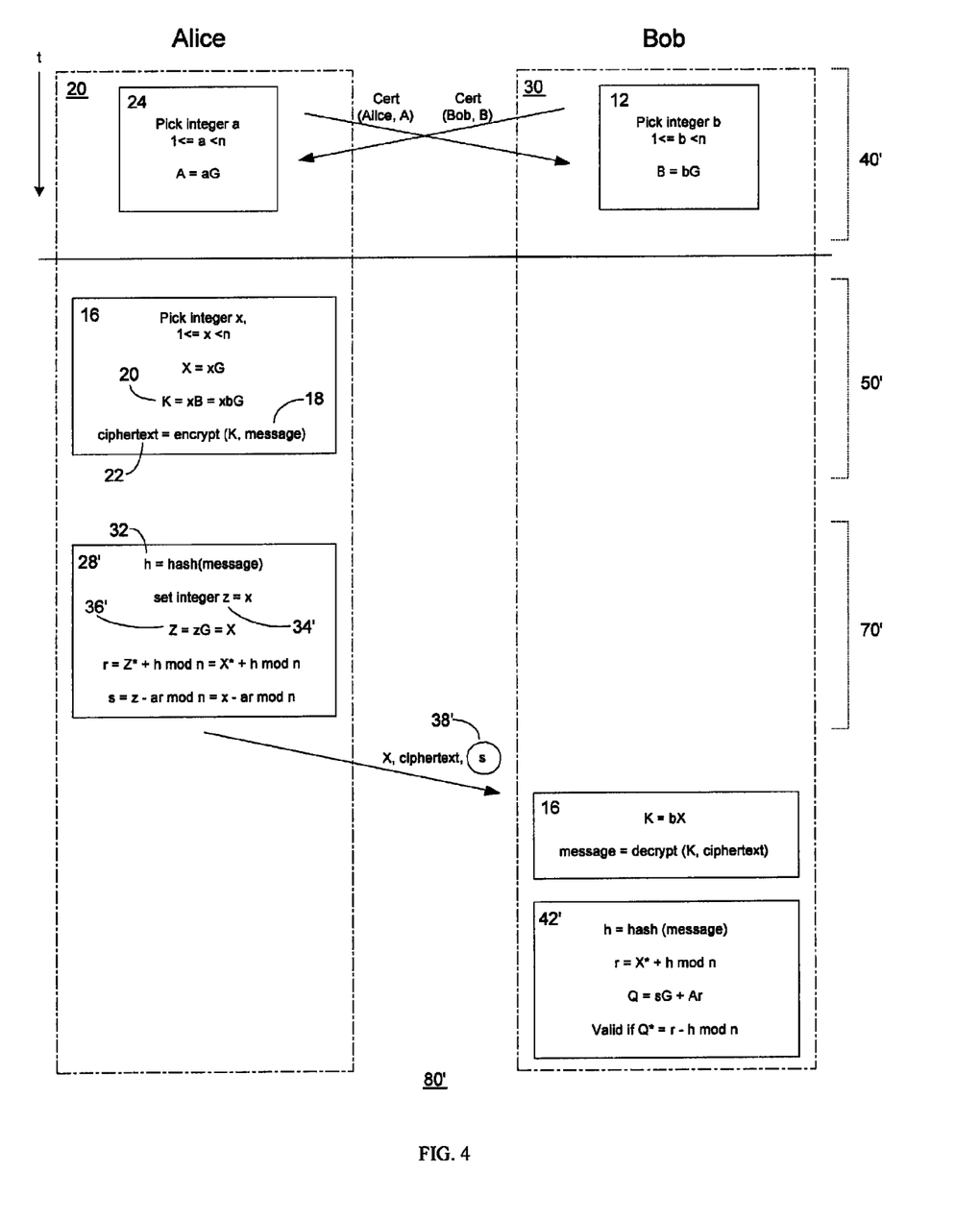
FIG. 4 is a functional diagram of the present invention's public-key system with an improved digital signature scheme.

FIG. 4 illustrates an overview of a preferred embodiment of the present invention. Like the prior art, there are three main stages to the preferred embodiment of the present invention, namely the certification 40', encryption 50' and digital signature 70' stage.

In the certification stage, Alice generates a long term random private key a and computes public key A, where A=aG. Likewise, Bob randomly generates private key b and computes public key B, where B=bG. As described above in relation to FIGS. 1-3, Alice and Bob exchange authentic public keys A and B directly, through a certification authority or through a public key repository In the encryption stage 40', Alice generates an encryption ephemeral private key as random integer value x and computes a corresponding encryption ephemeral public key X, where X=xG. As described above, the set (X, x) represents the ephemeral key pair produced in the encryption scheme. With this information, Alice uses Bob's public key B to compute secret key K 20, given by K=xB. Alice then encrypts the message producing ciphertext=encrypt (K, message) 22.

The present invention outlined in FIG. 4 deviates from the prior art scheme of FIG. 3 in several important aspects. The improved digital signature scheme of the present invention uses the encryption ephemeral key pair (X, x) produced in the encryption stage 50' as a substitute for the signature ephemeral key pair (Z, z) required in the digital signature stage 70'. The value of signature ephemeral private key z 34' is set to the value of encryption ephemeral private key x from the encryption stage. Consequently, the random generation of z and the computation of Z 36' are not required since signature ephemeral public key Z 36' equals encryption ephemeral public key X 20. Advantageously, this reduces the computational load on the sender. In essence, the value for x is used for two different purposes. In the first instance, x is used for the encryption process scheme 50'. In the second instance, the x is also used in the digital signature scheme 70'.

After transmission of the encryption public key X 20, ciphertext 22 and signature s 38', Bob may then calculate secret key K=bX and then decrypt the message by message=decrypt (K, ciphertext). The digital signature scheme then preferably hashes the message 40 to calculate h, as indicated in block 42'. Two pieces of information for the digital signature still need to be computed, namely integers r and s. The integers are calculated as follows: r=Z*+h mod n=X*+h mod n and s=z−ar mod n=x−ar mod n. However, only s in addition to the encryption ephemeral public key X and the ciphertext must be transmitted to Bob in the inventive scheme 80'. Rather than r being transmitted to Bob, r is instead reconstructed at the receive side by calculating r=X*+h mod n. In this manner, the overall byte-size overhead associated with the digital signature 38' is reduced by not transmitting r. In a specific embodiment of the invention, the saving was in the range of twenty-two bytes. In portable two-way wireless communication devices, reducing the transmission by twenty-two bytes is considerably useful and advantageous.

Figure 5:
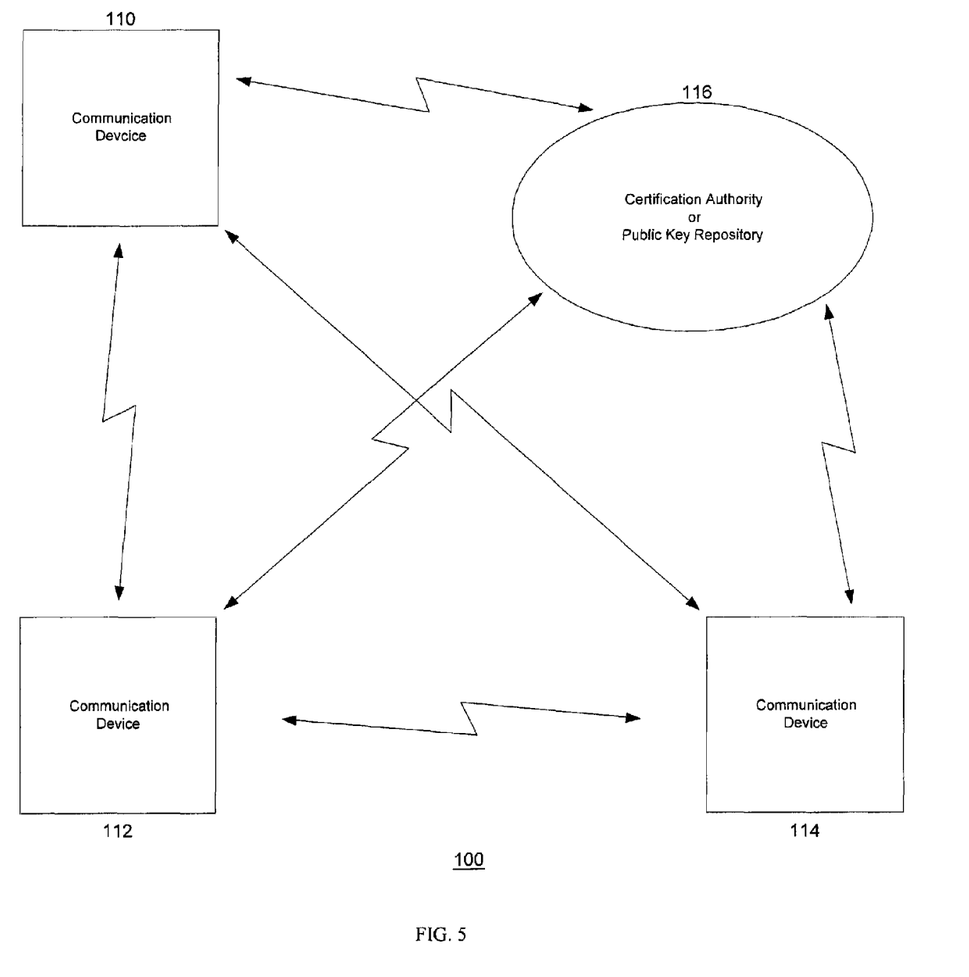
FIG. 5 is a block diagram of a communication system in which the invention could be implemented.

The inventive encryption and signature scheme outlined in FIG. 4 would preferably be implemented in software in a communication system. The block diagram in FIG. 5 represents one such system 100 in which the inventive scheme could be used. In FIG. 5, 110, 112 and 114 are communication devices and 116 is certification authority or public key repository. In order for the devices to communicate using the inventive scheme, each device must first exchange authentic public keys with the other device or devices with which communication is desired. As shown in FIG. 5 and described above, each device may communicate with a certification authority or public key repository 116 or with each other to accomplish public key exchange. Each communication device may incorporate software or hardware to perform the inventive encryption and signature scheme. Communication devices 110, 112 and 114 may be wired or wireless communication devices. This invention has particular application in, but not limited to, Personal Digital Assistants, mobile communication devices, cellular phones, two-way pagers and wireless two-way e-mail communication devices. One such illustrative device that may implement the present invention is disclosed in co-pending U.S. patent application Ser. No. 09/106,585, referenced above. In an alternative embodiment of the present invention, a system disclosed in FIG. 2 of PCT/CA99/00494 titled "System and Method for Pushing Information From a Host System to Mobile Data Communication Device", the specification of which is hereby incorporated by reference into the present disclosure, may implement the present invention. In all such systems, a typical system for which the present invention is particularly useful is a low bandwidth system such as one that utilizes an RF link in the communication path. The system and method of pushing information from a host system to a mobile described in the latter application is only one preferred system and method for the present invention herein; however, it is to be understood other types of systems and methods could be implemented that utilizes the present invention.

It will be appreciated that the above description relates to a preferred embodiment by way of example only. Many variations on the invention will be obvious to those knowledgeable in the field, and such obvious variations are within the scope of the invention as described and claimed, whether or not expressly described. For instance, the aforementioned process could obviously be extended to include multiple recipients from a single sender.

I claim:

1. A public-key decryption process for ciphertext messages, comprising:
    receiving from a sender a public key of a key pair that is used for a single message, a ciphertext message that was encrypted using the key pair, and a second value s of a digital signature that was generated using the key pair and that comprises a first value r and the second value s;

decrypting the ciphertext message into a plaintext message;

calculating the first value r of the digital signature using the plaintext message and the public key; and validating the digital signature based on the calculated first value r and the received second value s.

2. The public-key decryption process of claim 1, wherein the ciphertext message was encrypted utilizing an El Gamal encryption scheme.

3. The public-key decryption process of claim 1, wherein the step of validating the digital signature comprises hashing the plaintext message.

4. The public-key decryption process of claim 1, wherein the key pair was produced by performing steps comprising:
generating a private key x; and
calculating the public key X=xG in a finite cyclic group having G as a generator.

5. The public-key decryption process of claim 4, wherein the decrypting step comprises:
generating a secret key K=bX; and
decrypting the ciphertext message using the secret key K to generate a plaintext message.

6. The public-key decryption process of claim 5, wherein the sender used the private key x as a signature private key and used the public key X as a signature public key to generate the digital signature.

7. The public-key decryption process of claim 4, wherein the decrypting step comprises:
generating a secret key K by calculating one of: bX, bxG, xbG, and xB; and
decrypting the ciphertext message using the generated secret key K.

8. The public-key decryption process of claim 1 implemented in a wireless communication system;
wherein at least a two stage public-key decryption process is used;
wherein a first stage includes key establishment and the second stage includes decryption;
wherein decrypting the plaintext message and validating the digital signature are performed during the second stage.

9. The public-key decryption process of claim 1, further comprising:
at a sender,
generating a sender private key a; and
calculating a sender public key A=aG, where G is a generator,
and at a receiver,
generating a receiver private key b; and
calculating a receiver public key B=bG,
wherein the sender obtains an authentic copy of the receiver public key B and the receiver obtains an authentic copy of the sender public key A.

10. A communication device, comprising:
a computer-readable memory encoded with software instructions; and wherein:
the communication device is configured to receive from a sender a public key X of a key pair that is used for a single message, a ciphertext message that was encrypted using the key pair, and a second value s of a digital signature that was generated using the key pair and that comprises a first value r and the second value s;
the communication device is configured to decrypt the ciphertext message into a plaintext message;
the communication device is configured to calculate the first value r of the digital signature using the plaintext message and the public key; and
the communication device is configured to validate the digital signature based on the calculated first value r and the received second value s.

11. The communication device of claim 10, wherein the communication device is further configured to hash the plaintext message when validating the digital signature.

12. The communication device of claim 10, wherein the communication device is further configured to generate a secret key K=bX where b is a receiver private key; and wherein the communication device is further configured to decrypt the cybertext message using the secret key K.

13. The communication device of claim 10, wherein the communication device is further configured to generate a secret key $K$ by calculating one of: bX, bxG, xbG, and xB where b is a receiver private key, B is a receiver public key, x is a private key of the key pair that is used for a single message and G is a generator; and wherein the communication device is further configured to decrypt the ciphertext message using the secret key K.

14. The communication device of claim 10, wherein the communication device is further configured to:
generate a receiver private key b;
calculate a receiver public key B=bG, where G is a generator; and
obtain an authentic copy of the sender public key A.

15. A wireless device for decrypting data, comprising:
a data processor;
a computer-readable memory encoded with instructions for commanding the data processor to execute steps including:
receiving from a sender a public key X of a key pair that is used for a single message, a ciphertext message that was encrypted using the key pair, and a second value s of a digital signature that was generated using the key pair and that comprises a first value r and the second value s;
decrypting the ciphertext message into a plaintext message;
calculating the first value r of the digital signature using the plaintext message and the public key; and
validating the digital signature based on the calculated first value r and the received second value s.

16. The wireless device of claim 15, wherein the computer-readable memory is further encoded with instructions for commanding the data processor to execute steps including hashing the plaintext message when validating the digital signature.

17. The wireless device of claim 15, wherein the computer-readable memory is further encoded with instructions for commanding the data processor to execute steps including:
generating a secret key K=bX where b is a receiver private key; and
decrypting the ciphertext message using the secret key K.

18. The wireless device of claim 15, wherein the computer-readable memory is further encoded with instructions for commanding the data processor to execute steps including:
generating a secret key K by calculating one of: bX, bxG, xbG, and xB where b is a receiver private key, B is a receiver public key, x is a private key of the key pair that is used for a single message and G is a generator; and
decrypting the ciphertext message using the secret key K.

19. The wireless device of claim 15, wherein the computer-readable memory is further encoded with instructions for commanding the data processor to execute steps including:
generating a receiver private key b;

calculating a receiver public key B=bG, where G is a generator; and obtaining an authentic copy of the sender public key A.

* * * * *